(12) United States Patent
Jones et al.

(10) Patent No.: US 9,431,035 B2
(45) Date of Patent: Aug. 30, 2016

(54) METHOD OF SHAPING A TRAILING EDGE OF A SLIDER

(71) Applicant: Seagate Technology LLC, Cupertino, CA (US)

(72) Inventors: Gordon Merle Jones, Faribault, MN (US); Edwin Frank Redja, Bloomington, MN (US); Joseph Michael Stephan, Eden Prairie, MN (US)

(73) Assignee: Seagate Technology LLC, Cupertino, CA (US)

(*) Notice: Subject to any disclaimer, the term of this patent is extended or adjusted under 35 U.S.C. 154(b) by 350 days.

(21) Appl. No.: 13/963,044

(22) Filed: Aug. 9, 2013

(65) Prior Publication Data
US 2015/0040380 A1 Feb. 12, 2015

Related U.S. Application Data

(62) Division of application No. 13/399,782, filed on Feb. 17, 2012, now abandoned.

(51) Int. Cl.
| | |
|---|---|
| G11B 5/127 | (2006.01) |
| H04R 31/00 | (2006.01) |
| G11B 5/187 | (2006.01) |
| G11B 5/10 | (2006.01) |
| G11B 5/31 | (2006.01) |
| G11B 5/60 | (2006.01) |

(52) U.S. Cl.
CPC .............. *G11B 5/1871* (2013.01); *G11B 5/102* (2013.01); *G11B 5/3173* (2013.01); *G11B 5/6082* (2013.01); *Y10T 29/49021* (2015.01)

(58) Field of Classification Search
CPC .............. G11B 5/1871; G11B 5/3116; Y10T 29/49052; Y10T 29/49041; Y10T 29/49032; Y10T 29/49021; B81B 3/0021
USPC ......... 29/603.01, 603.12, 603.14; 360/234.7, 360/235.7, 236.5
See application file for complete search history.

(56) References Cited

U.S. PATENT DOCUMENTS

| | | | |
|---|---|---|---|
| 5,335,458 A | 8/1994 | Stoffers et al. | |
| 5,353,180 A | 10/1994 | Murray | |
| 5,359,479 A | 10/1994 | Karam, II | |
| 5,612,839 A | 3/1997 | Jacques | |
| 5,634,259 A * | 6/1997 | Sone .................... | G11B 5/3103 29/603.12 |
| 5,752,309 A | 5/1998 | Partee et al. | |
| 5,822,153 A | 10/1998 | Lairson et al. | |
| 5,886,856 A | 3/1999 | Tokuyama et al. | |
| 5,917,679 A | 6/1999 | Park et al. | |
| 6,333,836 B1 | 12/2001 | Boutaghou et al. | |
| 6,421,205 B1 | 7/2002 | Dorius et al. | |
| 6,452,750 B1 | 9/2002 | Fukuroi et al. | |
| 6,521,902 B1 | 2/2003 | Chang et al. | |

(Continued)

*Primary Examiner* — Thiem Phan
(74) *Attorney, Agent, or Firm* — Faegre Baker Daniels LLP

(57) ABSTRACT

A slider comprising a body having an air bearing surface (ABS), wherein the ABS extends between a leading edge and a trailing edge of the body. The slider comprises a transducer supported by the body and positioned near the trailing edge, wherein the transducer comprises a pole tip partially extending from the body. The slider comprises a surface defined in the body and forming the trailing edge, wherein the surface comprises a plurality of segments. A first segment of the plurality of segments extends from the ABS and is offset from a portion of the pole tip recessed within the body. The first segment is offset from the pole tip portion by a lesser extent than any other of the plurality of segments.

7 Claims, 7 Drawing Sheets

(56) References Cited

U.S. PATENT DOCUMENTS

| | | |
|---|---|---|
| 6,531,084 B1 | 3/2003 | Strom et al. |
| 6,639,755 B2 | 10/2003 | Boutaghou et al. |
| 6,920,016 B2 | 7/2005 | Yamakura et al. |
| RE39,004 E | 3/2006 | Park et al. |
| 7,281,317 B2 | 10/2007 | Ohno et al. |
| 7,335,272 B2 | 2/2008 | Takanuki et al. |
| 7,724,474 B2 | 5/2010 | Maejima et al. |
| 7,787,215 B2 | 8/2010 | Narushima et al. |
| 7,859,794 B2 | 12/2010 | Tani et al. |
| 2002/0015265 A1 | 2/2002 | Kanda et al. |
| 2002/0041467 A1 | 4/2002 | Boutaghou et al. |
| 2004/0264051 A1 | 12/2004 | Gronseth et al. |
| 2005/0007699 A1 | 1/2005 | Ohno et al. |
| 2005/0121133 A1 | 6/2005 | Takanuki et al. |
| 2006/0023359 A1 | 2/2006 | Matsushita |
| 2008/0198510 A1 | 8/2008 | Sugimoto et al. |
| 2008/0239550 A1 | 10/2008 | Nagai |
| 2008/0266716 A1 | 10/2008 | Kato |
| 2009/0168248 A1 | 7/2009 | Matsumoto et al. |

\* cited by examiner

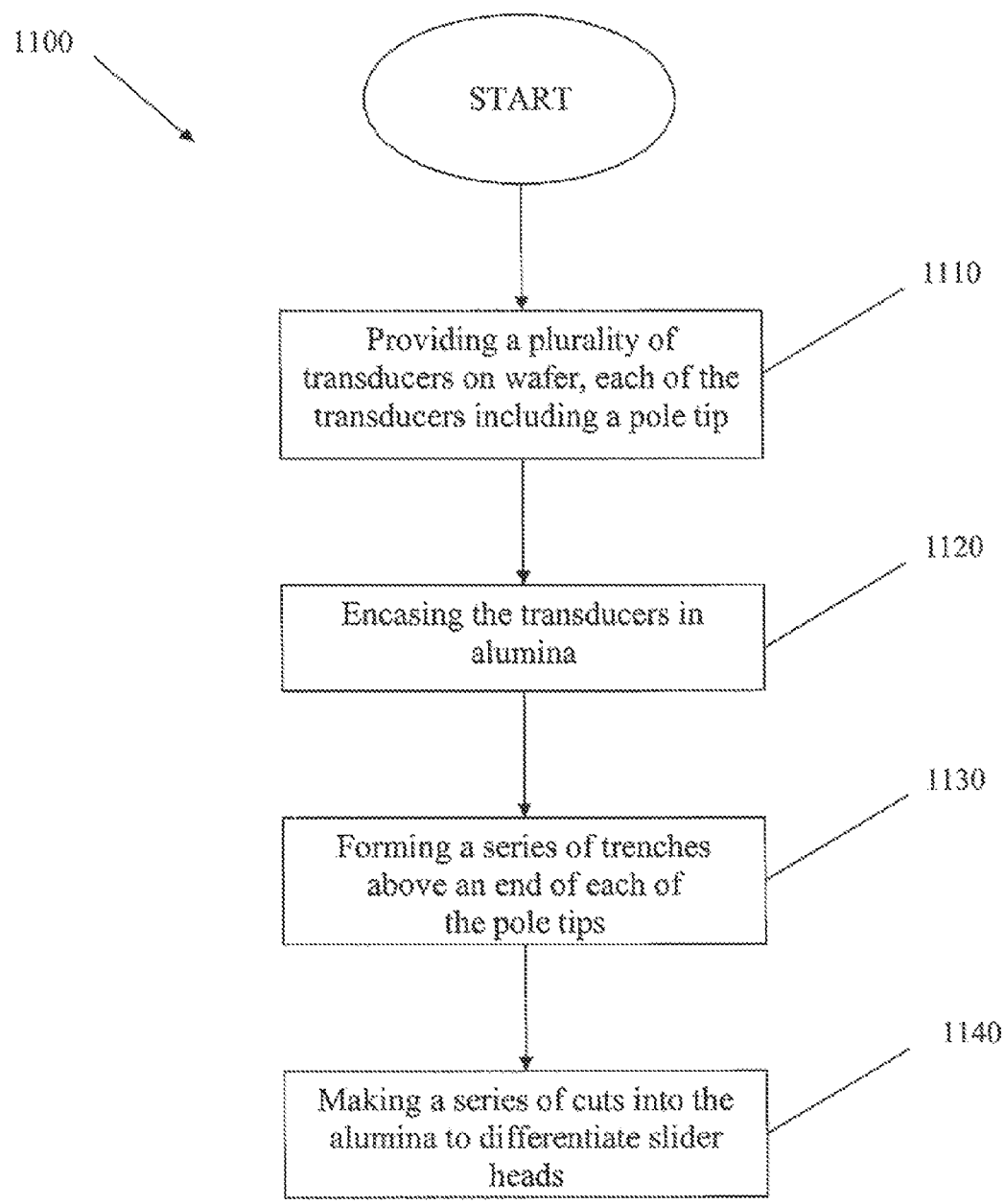

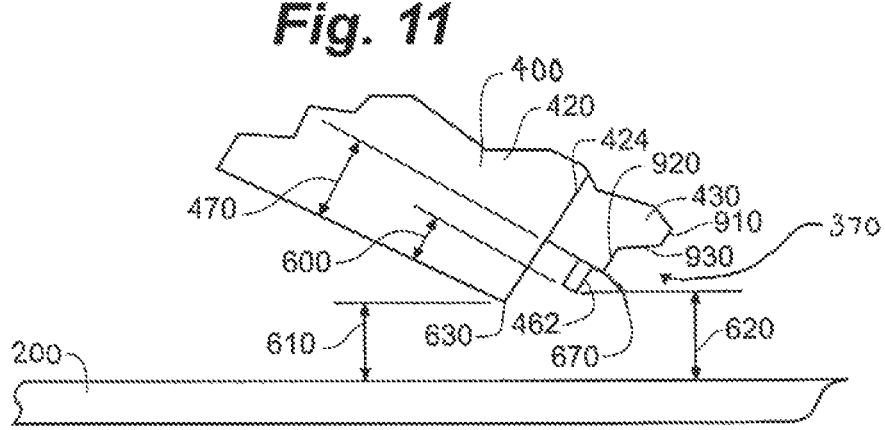

METHOD OF SHAPING A TRAILING EDGE OF A SLIDER

CROSS-REFERENCE TO A RELATED APPLICATIONS

This divisional application claims the benefit of U.S. Utility patent application Ser. No. 13/399,782, filed Feb. 17, 2012, entitled "SLIDER EDGE FEATURES", which is hereby incorporated by reference.

BACKGROUND

Basic parts of a disc drive generally include a disc that is rotated, an actuator that moves a transducer to various locations over the disc, and electrical circuitry that is used to write and read data to and from the disc. Typically, the transducer functions with the electrical circuitry, translating electrical signals into magnetic field signals for recording data "bits" to the disc, or vice versa for reading data "bits" from the disc.

The transducer is generally housed within a small ceramic block known as a slider, with the slider being passed over the rotating disc at a certain fly height. Generally, greater performance of the disc drive results when the slider is flown as closely to the surface of the disc as possible. In operation, the distance between the slider and the disc, or "fly" heights or head media spacing, can be in the range of micro inches. It is contemplated that fly heights will continue to be reduced, for this is one factor in achieving increased recording density. However, this will require considerable care or else head/media intermittent contact can result. Such contact induces vibrations detrimental to the reading/writing quality at such low fly height, and can also eventually result in a head crash and total loss of data.

One manner by which head media spacing has been decreased to date is via shaping the alumina located at the trailing edge of the slider. Typically, the slider is formed from a wafer of ceramic material. The transducer or transducers (separate read and write elements) are placed onto the wafer and then encased in alumina. Once encased, the wafer is diced to form individual heads, and then the alumina is shaped to include various features. Shaping the alumina at the trailing end of the slider can be beneficial in enabling the head to fly at decreased spacing with respect to the media. However, the conventional shaping process can result in alumina features being inconsistently formed from head to head. Such inconsistency can in turn lead to undesirable variance in fly height from slider to slider. A reason for such variance is that the alumina features are formed at the bar level, or after the wafer has been cut into individual heads. Consequently, the corresponding cuts are often found to vary from head to head, leading to inconsistency in fly heights for the heads, and inconsistent results being obtained during reading and recording of data.

SUMMARY

In certain embodiments of the invention, a slider is provided. The slider comprises a body having an air bearing surface (ABS), wherein the ABS extends between a leading edge and a trailing edge of the body. The slider comprises a transducer supported by the body and positioned near the trailing edge, wherein the transducer comprises a pole tip partially extending from the body. The slider comprises a surface defined in the body and forming the trailing edge, wherein the surface comprises a plurality of segments. A first segment of the plurality of segments extends from the ABS and is offset from a portion of the pole tip recessed within the body. The first segment is offset from the pole tip portion by a lesser extent than any other of the plurality of segments.

These and various other embodiments, features, and advantages will be apparent from a reading of the following detailed description.

BRIEF DESCRIPTION OF THE DRAWINGS

FIG. 10 is a flow diagram showing steps for fabricating a slider as detailed with reference to FIGS. 7-9.

FIG. 11 is a partial side view of the single center pad of FIGS. 2-4 which shows effect of shaping alumina material of trailing edge of the slider via the process steps of FIG. 10.

DETAILED DESCRIPTION OF THE PREFERRED EMBODIMENTS

Figure 1:
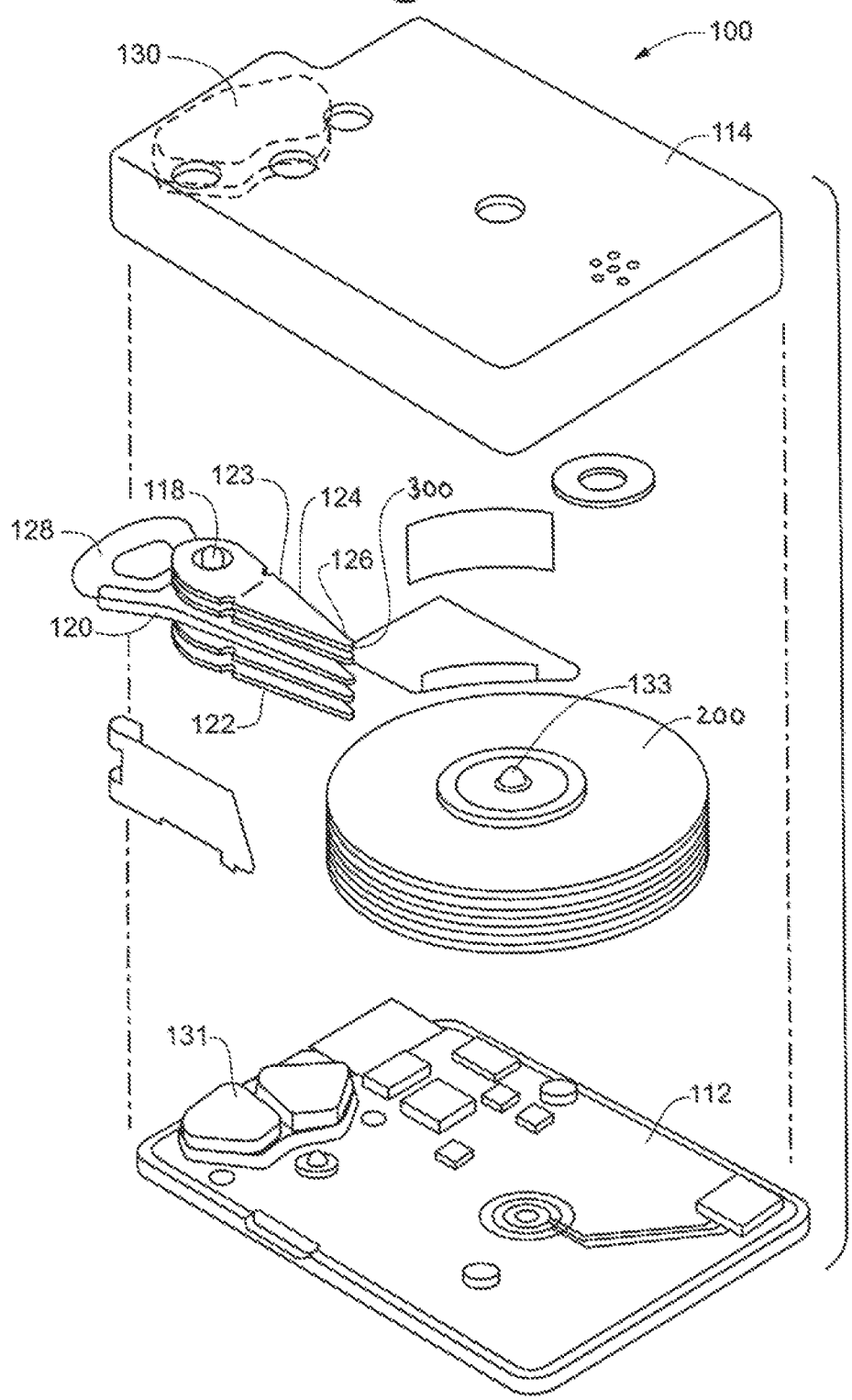
FIG. 1 is an expanded view of a disc drive in accordance with certain embodiments of the invention.

The following detailed description should be read with reference to the drawings, in which like elements in different drawings are numbered identically. Embodiments shown in the drawings are not necessarily to scale, unless otherwise noted. It will be understood that embodiments shown in the drawings and described herein are merely for illustrative purposes and are not intended to limit the invention to any embodiment. On the contrary, it is intended to cover alternatives, modifications, and equivalents as may be included within the scope of the invention as defined by the appended claims.

Embodiments of the invention described herein focus on sliders. As alluded to above, a slider is formed with a transducer. As detailed herein, the slider can be shaped so that the transducer's read/write performance is enhanced. As further detailed, material forming the slider is shaped during steps of fabricating the slider. While slider embodiments described herein exemplify sliders being formed of alumina (a material that has been conventionally used), it should be appreciated that the invention is also applicable to sliders formed of other suitable alternative material(s). Further, while sliders are described herein with respect to their applicability in drives (such as hard disc drives, zip drives, floppy disc drives and any other type of drives), it should be appreciated that the invention is just as applicable to other apparatus configured to utilize a slider with transducer.

FIG. 1 is an exploded view of one type of disc drive 100 in accordance with certain embodiments of the invention. As shown, the disc drive 100 can include a base 112 and a cover 114, together forming an enclosure for one or more discs 200. In certain embodiments, an actuator assembly 120 can be rotatably attached to the base 112 via an actuator shaft 118. Further corresponding structures can include a voice coil 128 and a pair of magnets 130 and 131, which can be collectively used as a motor for applying force to the actuator assembly 120 to rotate it about the actuator shaft 118. The actuator assembly 120 can include a comb-like structure 122 having a plurality of arms 123. As shown, extending along each of the separate arms 123, and away from the actuator shaft 118, is a load beam or load spring 124, each of which has a slider 300 attached thereto (e.g., at a narrowed end of the load spring 124). As will be further described herein, each slider 300 carries a magnetic transducer 150. The slider 300 (with transducer 150) is a structure also commonly referred to as a head. It should be noted that many sliders have one transducer 150 and that is what is shown in the figures. However, this invention is equally applicable to sliders having more than one transducer.

Figure 2:
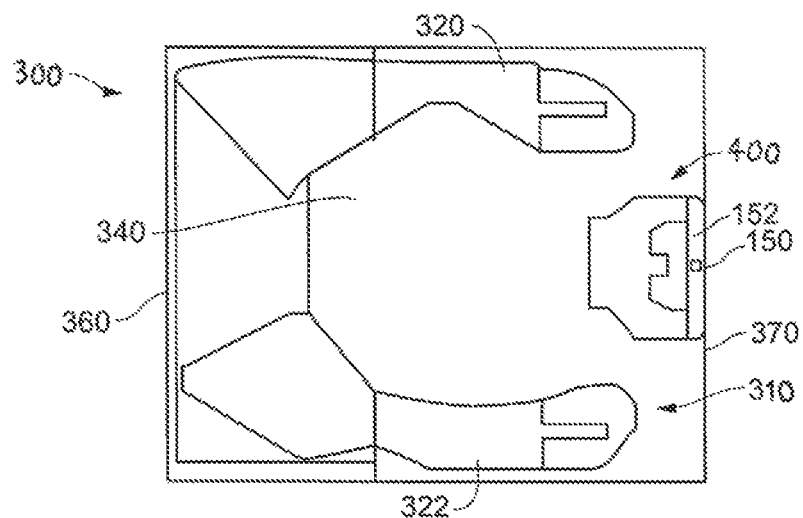
FIG. 2 is a bottom view of a slider of FIG. 1.

In certain embodiments, as shown, moving the actuator assembly 120 moves all the load springs 124 in unison. In operation, the actuator assembly 120 is moved to a park position when the disc drive is powered down. Alternatively, when the disc drive is powered on, the actuator assembly 120 can be used to move the sliders 300 into an operating or transducing position over the area of the disc used to read or write information representative of data. The actuator assembly 120 can also be used to seek various data locations on the surface of the disc. As shown, a spindle hub 133 can be used for rotating the one or more discs 200. In this embodied disc drive, a spindle motor is within the hub 133. The discs 200 are accelerated to a speed whereby relative velocity between the sliders 300 and corresponding discs 200 would cause such sliders 300 to lift off the surface of the discs 200. FIG. 2 is a bottom view of one of the sliders 300 of FIG. 1. While FIG. 2 shows one slider configuration, it should be understood that the configuration is exemplary, and that embodiments of the invention are just as applicable to other alternative slider configurations. As illustrated, the slider 300 includes an air-bearing surface (ABS) 310 with a single center pad 400, a first side rail 320, and a second side rail 322 thereon. The center pad 400 and side rails 320 and 322 are portions which contact the disc 200 during take-off and landing of the slider 300. Conversely, a single-level cavity 340 is formed between the side rails 320 and 322 as well as the center pad 400, with the cavity 340 being a non-contact portion of the ABS 310. The slider 300 has a leading edge 360 and a trailing edge 370, with the transducer 150 generally positioned at or near the trailing edge 370. As shown in FIG. 2, the transducer 150 fits within a slot 152 within the single center pad 400.

Figure 3:
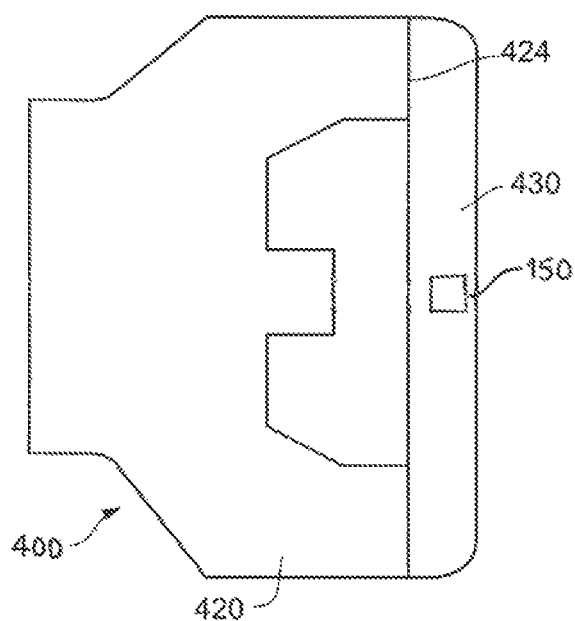
FIG. 3 is an enlarged bottom view of a single center pad of the slider of FIG. 2.
Figure 4:
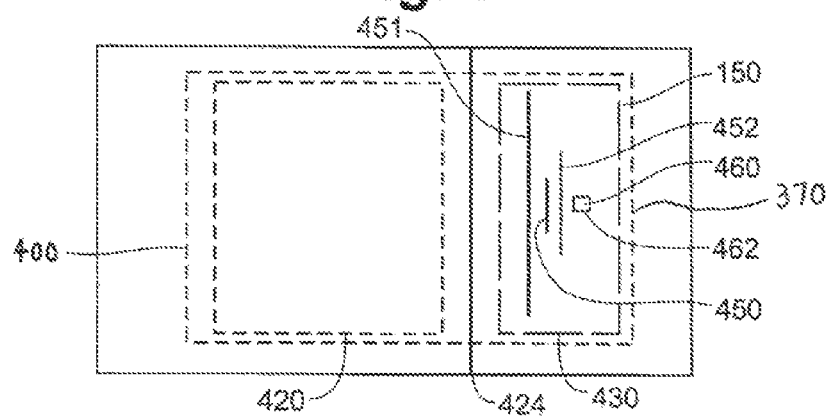
FIG. 4 is a schematic bottom view of the single center pad of the slider of FIG. 2.

FIGS. 3 and 4 show enlarged bottom and schematic views of the single center pad 400 of FIG. 2, respectively. With reference to FIG. 3, the single center pad 400 can be thought of as having a first portion 420 and a second portion 430. The first portion 420 of the single center pad 400 is generally part of a substrate of an entire slider, such as the slider 300 of FIG. 1. The substrate of the slider 300 is typically made of a ceramic material. The second portion 430 of the single center pad 400 is often comprised of a material different than the substrate or different than the first portion 420. Typically, the second portion 430 of the center pad 400 is comprised of alumina. Located between the first portion 420 and the second portion 430 of the single center pad 400 is an alumina substrate interface 424. Partially located within the alumina is the transducer 150, represented in FIG. 4 as being surrounded by a dotted box representing the slider 400.

With further reference to FIG. 4, the structure of the transducer 150, in certain embodiments, includes a read element 450 (e.g., a magneto-resistive element) and a write element 460, with the elements separated by shields 451 and 452 for preventing interference there between from magnetic flux. The write element 460 generally takes the form of a thin film head, which is placed on the back edge of the slider 300. As shown, the thin film head can include a pole tip 462. The transducer 150 structure is typically formed on the trailing edge 370 of the slider 400 using various deposition techniques.

Figure 5:
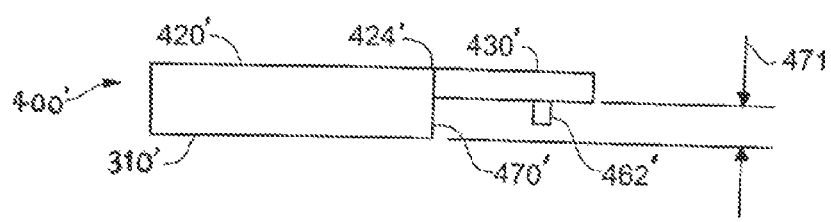
FIG. 5 is a side view of a conventional single center pad of a slider.
Figure 6:
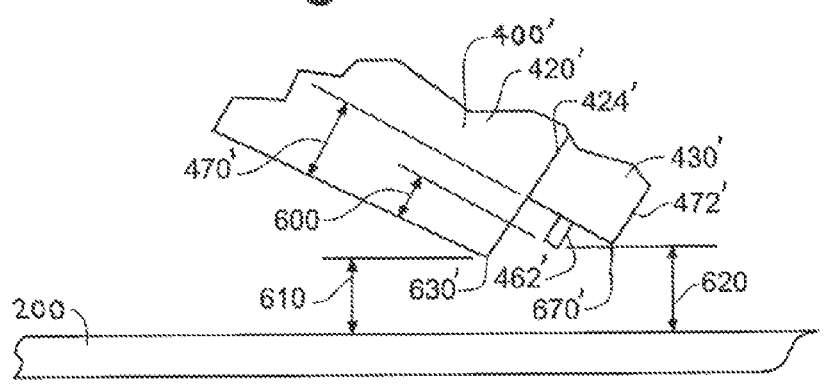
FIG. 6 is a partial side view of the single center pad of FIG. 5 showing location of mechanical close point and clearance between the close point and a disc, and pole tip fly height of transducer.

FIG. 5 is a side view of a conventional single center pad 400', and FIG. 6 is a further partial side view of such single center pad 400' in use as a part of a slider 300'. The single center pad 400', as shown, has similar structure to the pad 400 already described in FIGS. 2-4. For example, the center pad 400' has first portion 420' and second portion 430' separated by substrate interface 424'. In addition, the center pad 400' includes a write element pole tip 462' protruding from the bottom of the second portion 430', with remainder of the transducer 150 being encased in alumina that forms the second portion 430'. The process of encapsulating the transducer 150 in the alumina is what forms the second portion 430' of the single center pad 400'. To that end, during its formation, the alumina is sliced away, leaving the pole tip 462' protruding from the bottom of the alumina. The alumina is said to be recessed from the ABS 310' of the first portion 420' of the single center pad 400'. The difference in levels between the air-bearing portion of the second portion 430' and the air-bearing portion of the first portion 420' form what is known as the alumina recession 470', and the recession distance is shown as 471.

In FIG. 6, the single center pad 400' is shown tilted with respect to a disc 200. While it is common for the single center pad to be tilted in use, the tilt of the slider is exaggerated in this particular schematic diagram to more clearly show the distances between different portions of the single center pad 400'. To that end, when the slider 300' and the center pad 400' are tilted, it can be seen that the center pad second portion 430' is more closely spaced to the disc 200 than if the center pad 400' was oriented substantially parallel to the surface of the disc 200. To that end, in flying at an attitude or tipped up slightly, the center pad second portion 430' becomes a factor in determining how high the slider will fly above the disc 200.

As further shown in FIG. 6, the center pad second portion 430' has a corner 670' at the trailing edge 472' of the slider 300' which is very nearly as closely spaced to the disc 200 as the center pad first portion 420'. To that end, the center pad first portion 420' also has a corner 630' which is near the disc 200 when flying or passing over the disc 200 in transducing relation with the disc 200. The distance between the corner 630' and the disc 200 is the mechanical close point clearance 610. The corner 670' of the center pad second portion 430' is also very close to the disc 200 (with such corresponding distance referenced as close point clearance 620); however, as shown, it is typically not as close as the mechanical close point 630'. Even though they differ in height from the disc 200, both corners 630' and 670' of the center pad 400' are high pressure points since gas, such as air, is compressed at the close corners 630' and 670' during flight of the slider 300' and the center pad 400' (attached to the slider).

Controlling the exact formation of the corner of the center pad second portion and its trailing edge surface is difficult given the very small spacing and different methods of manufacture, which when collectively considered, can explain why alumina area of the center pad second portion can vary. However, alumina variation is detrimental to the head/disc interface because it introduces larger variability in fly height. In other words, sliders having different amounts of alumina at their trailing edges, albeit even minute differences, can consequently lead to significant variation in fly heights between the sliders. As can be seen from FIG. 6, in conventional designs, the alumina has been sliced with a single cut to create the trailing edge surface 472'. Advantages of such design involve ending up with a smooth trailing edge, made at a sufficient distance from the pole tip 462' so as to not interfere with or damage the transducer 150, yet allow for desired head media spacing.

In comparison to the configuration shown in FIG. 6, other methods have involved slicing further alumina from the trailing edge so as to close in on the pole tip 462'. To that end, instead of a single cut or slice at the trailing edge surface 472', a series of cutting or shaping steps have been alternatively performed to rid the center pad second portion 430' of further alumina. For example, a first cut can be made to form the corner 670' of the center pad second portion 430' proximate to the pole tip 462', and one or more subsequent cuts are made to or from this initial cut which in essence breaks away the corresponding bulk of the alumina from the center pad second portion 430'.

While such cutting or shaping processes are stringently controlled, the very minute surfaces of the center pad trailing edges enhance the level of difficulty in controlling the process. To that end, as described above, the conventional process generally involves such cutting or shaping steps taking place at the bar level, or after the wafer has been cut into individual heads. Controlling a shaping process with such microscopic heads is quite difficult, let alone repeatedly performing such process on an individual basis. Variations, while minute, are known to occur, and with such variation, the resulting sliders can be found to exhibit inconsistencies in their fly heights.

To that end, it has been determined that using shaping and cutting processes further upstream in the slider fabrication process is a more effective approach. In certain embodiments, alumina shaping and cutting steps are performed at the wafer level. As detailed herein, performing these steps at this stage of the fabrication process allows for a more controllable platform as opposed to being performed at the microscopic bar level. Additionally, using the wafer as the platform, in which stacked rows of transducers are encased in alumina, cutting and shaping steps can be performed on row after row of the transducers prior to the rows being cut from the wafer into individual heads.

Figure 7:
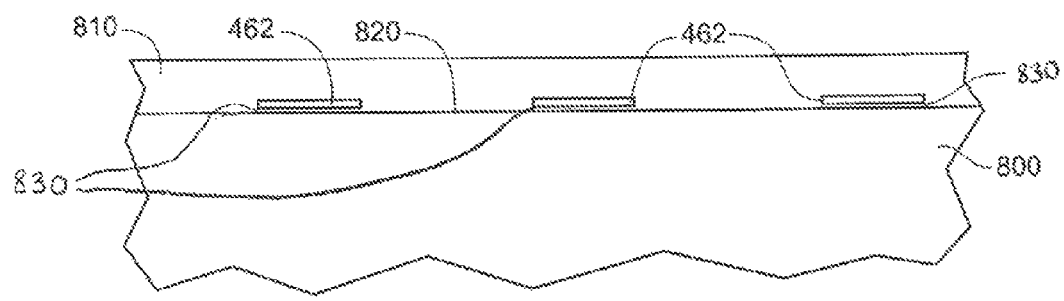
FIG. 7 is a partial sectional side view of a wafer of ceramic material used for slider trailing edge formation in accordance with certain embodiments of the invention.
Figure 8:
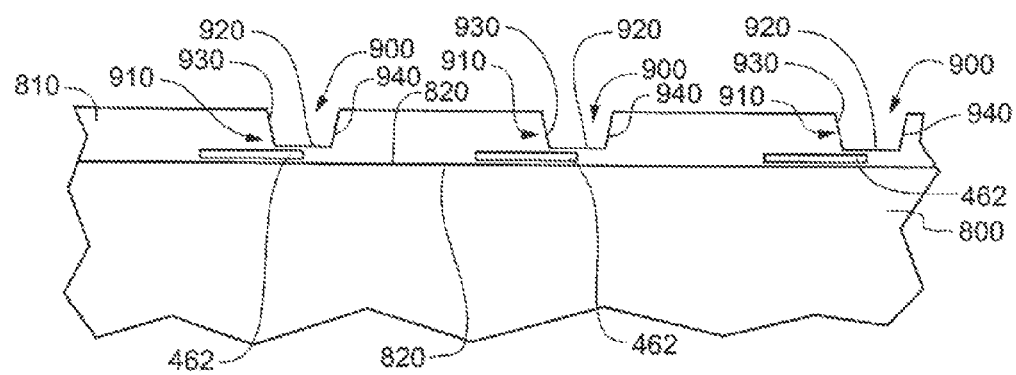
FIG. 8 is the partial sectional side view of the wafer of FIG. 7 following alumina etching step in accordance with certain embodiments of the invention.
Figure 9:
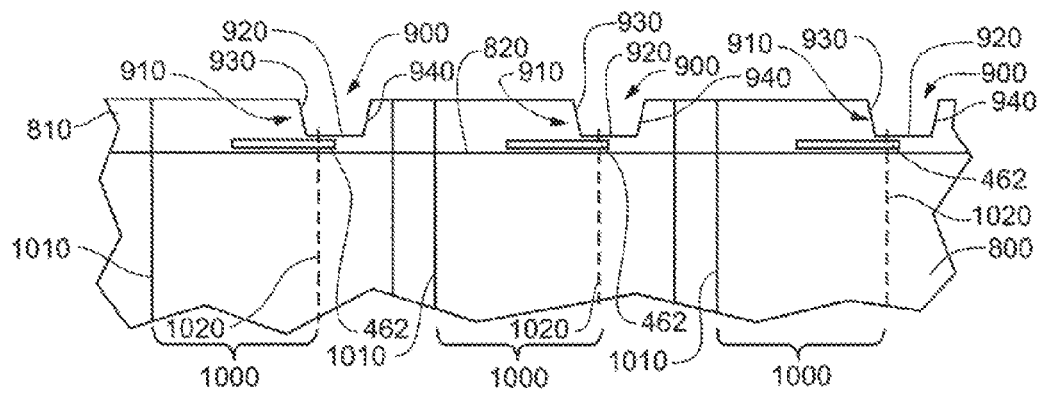
FIG. 9 is the partial sectional side view of the wafer of FIG. 8 showing wafer slicing lines prior to slicing step in accordance with certain embodiments of the invention.

FIGS. 7-9 are partial sectional views of a wafer of ceramic material as provided prior to and/or following different steps of the slider trailing edge formation processes in accordance with certain embodiments of the invention. The process embodied herein, as well as the resulting sliders, differ in many ways from what has been conventionally practiced or obtained to date. FIGS. 10 and 11 relate to FIGS. 7-9, in that FIG. 10 is a flowchart of process steps for fabricating a slider, and more particularly, for shaping a trailing edge of a slider, as embodied with reference to FIGS. 7-9. Similarly, FIG. 11 is a partial side view of the single center pad 400 of FIGS. 2-4 which shows effect of shaping alumina material of trailing edge (of corresponding slider) via the process steps of FIG. 10. Accordingly, FIG. 11 is to be referenced in relation to FIGS. 7-10.

FIG. 7 shows a partial sectional view of a wafer of ceramic material prior to formation of the slider trailing edge formation, To that end, FIG. 7 shows such a wafer 800, and provided thereon and encased in alumina 810, is a plurality of transducers represented as the thin film magnetic features of the head, most notably the pole tip 462. In certain embodiments, the wafer is formed of AlTiC; however, the invention should not be limited to such. For instance, the wafer could be formed of other materials, such as silicon. Regarding the view of FIG. 7, it is to be understood that it is at this stage following conventional processes (and in contrast to the embodied methods described herein) that the wafer is typically cut into individual heads, from which the alumina is then shaped or cut.

In reference to flowchart 1100 of FIG. 10, FIG. 7 is representative of step 1110 of providing a plurality of transducers on a wafer 800, with each of the transducers including a pole tip 462, and step 1120 of encasing the transducers in alumina 810. The transducers (and pole tips 462) can be encased in the alumina 810 using any of a number of deposition techniques. For example, in certain embodiments, such technique can involve sputtering the alumina 810; however, the invention should not be limited to such. It is to be appreciated that the transducers can be encased in the alumina 810 before, during, or after being provided on the wafer 800. In one exemplary method in which sputtering techniques are used, a first thin layer 830 of alumina 810 is sputtered on an upper surface of the wafer 800 followed by positioning of the transducers on such layer 830, and then further sputtering alumina on such layer 830 so as to encase the transducers in the alumina 810. As shown, in certain embodiments, the alumina 810 has an interface 820 with the wafer 800 just below the pole tips 462. While only one row of transducers is represented, the invention should not be limited to such. For example, a wafer of ceramic material used in fabricating sliders will typically have row upon row of such transducers vertically stacked, from which a significant amount of individual heads are harvested.

FIG. 8 shows a partial sectional side view of the wafer 800 of FIG. 7 following alumina etching step. To that end, as shown above an end of each of the pole tips 462 is a trench 900, which serves as forming the trailing edge surface or feature for the slider head. As illustrated in FIG. 11, the trailing edge surface 910 has a series of distinct segments. One segment 920 of the trailing edge surface 910 lies nearest to each of the corresponding pole tips 462. In certain embodiments, where such trailing edge surface 910 extends over the pole tips 462, the amount of alumina is furnished significantly close to the tips 462. This is made possible in using the wafer 800 as the platform for alumina shaping because the depth of the pole tips 462 within the alumina is a known distance, which differs from conventional shaping or cutting processes in which the individual heads are cut from the wafer prior to shaping the alumina 810. As a consequence, the trenches 900 can be etched accordingly so as to run as close to the tips 462 as desired. In certain embodiments, the one segment 920 is etched so as to be substantially parallel with the tips 462. In etching at the wafer level, this same etch can be performed for each and every row of transducers that is encased in the alumina 810 on the wafer 800.

In reference to flowchart 1100 of FIG. 10, FIG. 8 is representative of step 1130 of forming a series of trenches 900 above an end of each of the pole tips 462. Further regarding the trenches 900, also shown are further segments 930 and 940 thereof. As illustrated, the further segments 930 and 940 branch from opposing edges of the one segment 920. As will be described with reference to FIG. 9 below, following slicing of the individual heads from the wafer 800, only further segment 930 and a portion of the one segment 920 will remain as representing the trailing edge surface 910 of the head. Thus, while each of further segments 930, 940 is shown as mirror images of each other, the discarded segment 940 can generally be etched as desired. However, in certain embodiments, the further segment 930 extends from the edge of the one segment 910 at an angle greater than 90 degrees, the significance of which will be described later with reference to FIG. 10.

FIG. 9 shows a partial sectional side view of the wafer 800 of FIG. 8 showing wafer slicing lines prior to slicing step. To that end, after etching the trenches 900 in the alumina 810, a series of slices are made in the wafer 800 to divide the individual heads 1000. In certain embodiments, a series of vertical cuts 1010 and 1020 are made into the alumina 810 for each head 1000. As illustrated in FIG. 9, these cuts 1010 and 1020 are shown as extending all the way through the wafer 800, yet that is done to illustrate how the cuts would continue to be made if other rows of transducers were provided on the wafer 800 and subsequently provided with etched trenches 900, as described above with reference to FIG. 8. However, regarding the transducer configuration shown in FIG. 9, the cuts 1010 and 1020 would be made into the alumina 810 and up to the alumina wafer interface 820. While cuts 1020 are shown as passing through the pole tips 462, it should be appreciated that such cuts 1020 would extend up to one side of the tips 462, around such tips 462, and then continue on the other side of such tips 462. For example, as already described above with reference to FIG. 8, in using the wafer 800 as the platform for alumina shaping, the depth of the pole tips 462 within the alumina is a known quantity, i.e., distance. Given that the dimensions of the pole tips 462 and the positions of the pole tips 462 in the alumina 810 are further known, it should be understood that various techniques in cutting around the pole tips 462 can be employed.

In reference to flowchart 1100 of FIG. 10, FIG. 9 is representative of step 1140 of making a series of cuts 1010, 1020 into the alumina 810 to differentiate slider heads. Following the cuts 1010 and 1020 being made, the row of heads would be sliced off. Thus, as described above, the trailing edge surface 910 of each head 1000 would have the one segment 910 extending substantially parallel to and in close proximity to the pole tip 462, and the further segment 930 extending from its end of the one segment 920 at an angle greater than 90 degrees. Of significant importance, however, is that because each head 1000 is processed collectively, the risk of alumina variation is minimized, which in turn, minimizes variability in fly height.

As described above, FIG. 11 is a partial side view of the single center pad 400 of FIGS. 2-4 which shows effect of shaping alumina material of trailing edge (of corresponding slider) via the process steps of FIG. 10. As shown, the trailing edge formation process of the invention provides certain benefits unattainable via the conventional cutting or shaping processes used at the bar level. For example, the process embodied herein enables excess alumina of the center pad second portion 430 to be etched as close as desired to the pole tip 462. In certain embodiments, as shown, the first or one segment 920 is offset from the recessed pole tip portion by a lesser extent than any other of the plurality of segments. Further, such excess alumina is removed without greatly varying the position of the corner 670 of the center pad second portion 430. As such, head media spacing can be reduced, while variability in fly height is kept relatively constant. Positively contributing to this attribute is the second or further segment 930 extending from the first or one segment 920 at an angle of greater than 90 degrees. Such angle allows air to rise gradually as it flows from under the air bearing surface, so as to have limited impact on fly height variability when the slider 300 is flown above the disc 200.

Figure 12A:
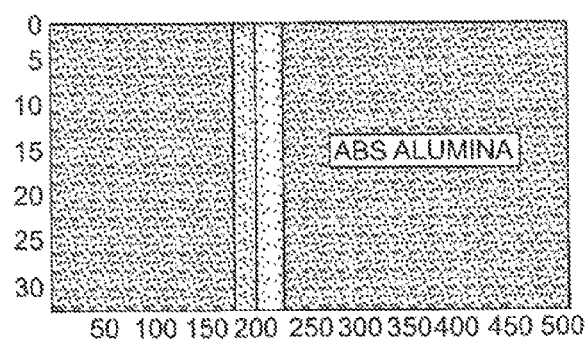
FIGS. 12A, 12B, and 12C are characterizations of effect of alumina at a slider trailing edge.
Figure 12B:
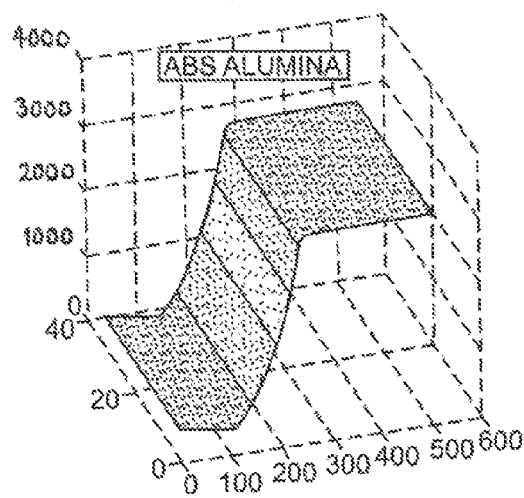
Figure 12C:
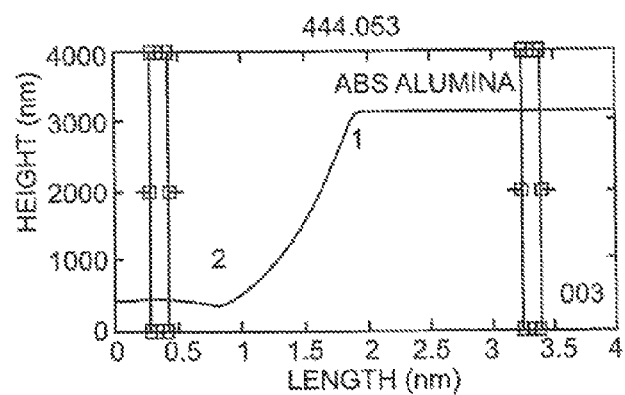

Further, being able to remove excess alumina proximate the pole tip 462 provides less potential interference to the read and write performance characteristics of the tip 462. Any excess alumina provided proximate to the pole tip 462 can be found to hinder its performance, but with such alumina being minimized proximate to the tip 462, this concern is likewise minimized. FIGS. 12A, 12B, and 12C show characterizations of the effect of alumina at a slider trailing edge, with reference to such trailing edge 370 of slider 300 of FIG. 11. Each of the graphs of FIGS. 12A, 12B, and 12C show a representative shape of the alumina created via the etching and cutting steps 1030 and 1040 of FIG. 10, with reference to FIGS. 8 and 9, respectively. As should also be understood, each of the two-dimensional graphs of FIGS. 12A and 12C relate back to the three-dimensional graph of FIG. 12B.

Starting with the graph of FIG. 12C, the beginning of the curve (referenced as "2"), having a height (shown on the y-axis) generally ranging between 0 nm and 1000 nm (e.g., less than 500 nm, and generally about 400 nm), is representative of segment 920 of the alumina of the slider trailing edge 370 and its depth from a recessed portion of the pole tip 962. Conversely, the rise of the curve (referenced as "1"), having a height (shown on the y-axis) generally ranging between 500 nm and 3000 nm, is representative of segment 930 of the alumina of the slider trailing edge 370 and its depth from a recessed portion of the pole tip 962. Looking next to the graph of FIG. 12A, alumina interference (shown on x-axis) is shown as going from low to high moving from left to right in the graph, with transition from low interference (ending at about 175 on the scale) to high interference (starting at about 225 on the scale). Referring to FIG. 12B, this can be generally seen by the bands generally falling in that same range on its x-axis. This transition, quite logically, occurs over the rise of the curve (referenced as "1"), which represents the segment 930 of the alumina of the slider trailing edge 370 (as shown in FIG. 11).

While the embodied method provides flexibility to etch the alumina as close to the tips 462 as desired, etching too close could prove costly and possibly cause damage to the pole tip 462. From FIGS. 12A-12C, in certain embodiments, the alumina proximate to pole tip 462 is maintained at a depth of less than or equal to 450 nm with respect to the pole tip 462. As a result, the degree of interference to the pole tip 462 can be kept at a low level without presenting risk of possibly damaging the pole tip 462 during fabrication.

Thus, embodiments of the present invention are disclosed. Although the present invention has been described in considerable detail with reference to certain disclosed embodiments, the disclosed embodiments are presented for purposes of illustration and not limitation. The implementations described above and other implementations are within the scope of the following claims.

What is claimed is:

1. A method of shaping a trailing edge of a slider, the method comprising:
   encasing a transducer in alumina, the transducer on a wafer of ceramic material and including a pole tip;
   forming a trench above an end of the pole tip; and
   making a series of cuts into the alumina relative to a pole tip of the transducer to differentiate a slider head,
   wherein each cut of the series of cuts extends to one side of a respective pole tip, around the respective pole tip, and continues on another side of the respective pole tip.

2. The method of claim 1 wherein the ceramic material comprises AlTiC.

3. The method of claim 1 wherein the transducer is a part of a plurality of transducers provided in one or more rows on the wafer.

4. The method of claim 3 wherein the trench is one of a plurality of trenches each of which is consistently formed with respect to one of the transducer pole tips.

5. The method of claim 4 wherein each of the trenches is formed using an etching process.

6. The method of claim 5, wherein each of the trenches includes a first segment that extends substantially parallel to the corresponding pole tip and wherein each trench includes a second segment that extends from the first segment in a direction perpendicular to a trailing edge surface of the slider at an angle of greater than 90 degrees.

7. The method of claim 1, wherein the pole tip protrudes from the alumina.

* * * * *